Patented Feb. 18, 1947

2,415,901

UNITED STATES PATENT OFFICE 2,415,901

PRESSURE SENSITIVE ADHESIVE TAPE

William L. Nelson, Highland Park, and William N. Morris, New Brunswick, N. J., assignors to Johnson & Johnson, a corporation of New Jersey No Drawing. Application September 14, 1944, Serial No. 554,160

2 Claims. (Cl. 117—122)

This invention relates to pressure sensitive adhesives adapted for use on adhesive tape, especially surgical adhesive tape.

Such adhesive tape usually consists of a cloth backing and a relatively thin layer of a pressure sensitive mass, that is an adhesive mass which adheres to a desired surface by being pressed gently against it and requires neither activation nor setting, as by heating, wetting or drying to establish the adhesion. Such pressure sensitive adhesives must be permanently tacky so as to adhere adequately to the desired surface and they must have sufficient cohesive strength or film strength to produce the requisite bond between the surface and the cloth backing. Likewise the adhesive bond between the cloth backing and the mass must be stronger than the bond established between the mass and the surface to which the tape is applied, and the cohesiveness of the mass must be so related to these factors as to permit the tape to be unrolled without the mass adhering to back of the tape and to permit the tape to be pulled cleanly from the surface to which it is attached, without leaving adhesive on the surface.

It will be evident that pressure sensitive adhesives in general should have all of the qualities above enumerated. However in adhesives for particular uses, these qualities or characteristics must be varied according to the conditions of usage and the nature of the surfaces to which the tape is principally to be applied. In the case of surgical tape, adequate adhesion to the human skin and clean removal from the skin are essential. Likewise freedom from unpleasant odor and irritational effects are required. A white or light color of the adhesive mass is desirable. In addition, all these qualities must be retained over long periods of time so that the tape may remain usable after transportation and lengthy storage.

Adhesives having the above characteristics to a greater or less degree have been long known. Rubber has generally been used as the base for pressure sensitive adhesives because it forms a tacky mass with certain resins, plasticizers and fillers, and the mass has desirable pressure sensitive qualities or cushion and is easily applied to suitable backings either by calendering or by mixing with a solvent and spreading. The pressure sensitive qualities of the mass depend upon the elastic and plastic qualities of rubber. Rosin or rosin derivatives and coumarone-indene resins have been largely used as tackifying resins for pressure sensitive masses. Lanolin and light petroleum oils or derivatives have been largely used as plasticizers. Zinc oxide, titanium dioxide, starch and hydrated alumina have been used as pigmenting and reinforcing and filling agents. Because of the marked tendency of masticated unvulcanized rubber as used in such masses to deteriorate with age, various suitable known anti-oxidants are customarily used to delay deterioration. However rubber base adhesives have certain limitations. They deteriorate with age in spite of the use of anti-oxidants, consequently after normal distribution and storage in readiness for use, they are frequently not usable. Moreover certain supersensitive individuals are allergic to rubber base adhesive tapes.

Our invention results from our discovery that polyvinyl normal butyl ether of high molecular weight can be modified by the addition of certain kinds of factice to provide improved bases for pressure sensitive adhesives. The polyvinyl normal butyl ether is an elastomer, by which we mean, for the purposes of this specification, a material which, regardless of its composition, is rubbery, or has elastic and plastic characteristics similar to rubber. The polyvinyl normal butyl ether and factice provide an elastomeric base, by which we mean a base having the properties which are characteristic of elastomers. Adhesives with these synthetic elastomeric bases age better than rubber base adhesives and are less irritating to persons having supersensitive skin. Adhesive masses based upon polyvinyl normal butyl ether alone are so tough that they are difficult to calender to cloth tape backings by the conventional calender rolls and they do not have adequate pressure sensitive qualities. With added factice however the masses have a desirable softness and cushion resembling that of adhesives having a natural rubber base and they are easily calendered. The factice appears to act as a dispersing agent for the tackifying resin and to impart a more lasting tacky characteristic to the mass. It has been found that polyvinyl normal butyl ether having a sufficiently high molecular weight to have a plasticity between about 2.0 and about 3.5 mm. at 100° C. in a Williams compression type plastometer is suitable for our purpose.

For the purpose of modifying the polyvinyl ether to improve the pressure sensitive and calendering characteristics of the resulting adhesive masses, we have found the following factices suitable: Amberex B, Amberex D, Amberex S and Factice 519-6, all made by Stamford Rubber Supply Company, Stamford, Connecticut. Amberex B is a light colored factice made from rapeseed oil and has an acetone extract value of about 15 per cent. Amberex S is a light colored factice made from soy bean oil and has an acetone extract value of about 45 per cent. Amberex D is a light colored factice made from castor oil and has an acetone extract value of about 45 per cent. Factice 519-6 is a dark factice made by the reaction of 100 parts of soy bean oil, 25 parts of Staybelite ester #10 and 28 parts of sulfur and it has an acetone extract value of about 45 per cent. (Staybelite ester #10 is said to be a glycerol ester of hydrogenated rosin and is sold by Hercules Powder Company, Wilmington, Delaware.)

As tackifying resin, we may use any of the resins commonly used in pressure sensitive adhesives, such as rosin or rosin derivatives and coumarone-indene resin or derivatives such as hydrogenated coumarone-indene resins. Staybelite ester #10 is an excellent tackifier.

The softener or plasticizer may be any suitable light petroleum oil as known in the art, for example, Circo light oil, a largely alicyclic oil consisting principally of hydrocarbons containing 25 to 30 carbon atoms per molecule and one or more naphthenic or aromatic rings in the molecule, or Circosol 2XH, both made by Sun Oil Company, Philadelphia, Pennsylvania, but we find that a particularly good plasticizer is Vistac #1, a low molecular weight polyisobutylene manufactured by Advance Solvents Corporation of New York. This can be mixed with small amounts of lanolin if desired. The pigment and filler may be zinc oxide, but if Factice 519-6 is used, we prefer to include titanium oxide to the extent of approximately half of the pigment content in order to avoid a brown color which this particular factice otherwise gives to the adhesive mass. Another suitable filler is hydrated alumina designated C-730 by Aluminum Ore Company, East St. Louis, Illinois.

An anti-oxidant must be used which does not irritate the skin and which does not discolor either the cloth backing or the adhesive mass, a suitable one being an alkylated polyhydroxy phenol known as Santovar O, made by Monsanto Chemical Company, St. Louis, Missouri.

In making adhesive tape embodying our invention we prepare an adhesive mass by mixing together on any conventional rubber mill the desired proportions of polyvinyl normal butyl ether, factice, tackifying resin, softener or plasticizer, filler and anti-oxidant and spread this on suitable cloth backing with the conventional calender. We have found that a suitable elastomeric base is provided when the polyvinyl normal butyl ether constitutes between about 62 per cent and about 85 per cent of the base, the remainder being factice which varies accordingly from about 38 per cent to about 15 per cent. When so used the polyvinyl normal butyl ether constitutes preferably between about 18 and about 30 per cent of the entire mass and factice constitutes between about 5 and 13 per cent. Preferably the proportions of the remaining constituents are tackifying resins from 20 to 35 per cent, softener from 5 to 20 per cent and filler from 20 to 35 per cent.

Examples of formulas making satisfactory adhesives embodying our invention are the following, the percentages being by weight.

Example 1

| | Percent |
|---|---|
| Polyvinyl normal butyl ether | 25 |
| Amberex S | 10 |
| Stabelite ester #10 (Hercules) | 30 |
| Circo light oil | 6 |
| Zinc oxide | 18 |
| Titanium oxide | 10 |
| Santovar O | 1 |
| | 100 |

Example 2

| | Percent |
|---|---|
| Polyvinyl normal butyl ether | 20 |
| Amberex B | 10 |
| Staybelite ester #10 (Hercules) | 30 |
| Circo light oil | 8 |
| Zinc oxide | 31 |
| Santovar O | 1 |
| | 100 |

Example 3

| | Percent |
|---|---|
| Polyvinyl normal butyl ether | 25 |
| Factice 519-6 | 10 |
| Staybelite ester #10 (Hercules) | 30 |
| Vistac #1 | 6 |
| Lanolin | 2 |
| C-730 (hydrated alumina) | 11 |
| Titanium oxide | 15 |
| Santovar O | 1 |
| | 100 |

We claim:

1. In an adhesive tape a pressure sensitive adhesive mass comprising an elastomeric base consisting of polyvinyl normal butyl ether from about 62 per cent to about 85 per cent and factice from about 38 per cent to about 15 per cent.

2. In an adhesive tape a pressure sensitive adhesive mass comprising an elastomeric base, a tackifier, a plasticizer, a filler and an anti-oxidant, the elastomer consisting of polyvinyl normal butyl ether from about 62 per cent to about 85 per cent and factice from about 38 per cent to about 15 per cent.

WILLIAM L. NELSON.
WILLIAM N. MORRIS.

REFERENCES CITED

The following references are of record in the file of this patent:

UNITED STATES PATENTS

| Number | Name | Date |
|---|---|---|
| 2,061,934 | Mueller-Cunradi | Nov. 24, 1936 |

FOREIGN PATENTS

| Number | Country | Date |
|---|---|---|
| 414,699 | British | Aug. 7, 1934 |

OTHER REFERENCES

Industrial and Eng. Chem., article by Fisher, pp. 941-945, vol. 31, No. 8, Aug. 1939. (Copy in Div. 50.)